(12) United States Patent
Paterson et al.

(10) Patent No.: US 10,948,963 B2
(45) Date of Patent: Mar. 16, 2021

(54) MESSAGE HANDLING UNIT

(71) Applicant: ARM Limited, Cambridge (GB)

(72) Inventors: Richard Andrew Paterson, Yhurgoland (GB); Seow Chuan Lim, Letchworth Garden City (GB); Alessandro Renzi, Cambridge (GB)

(73) Assignee: ARM Limited, Cambridge (GB)

( * ) Notice: Subject to any disclaimer, the term of this patent is extended or adjusted under 35 U.S.C. 154(b) by 283 days.

(21) Appl. No.: 16/035,884

(22) Filed: Jul. 16, 2018

(65) Prior Publication Data

US 2019/0073011 A1 Mar. 7, 2019

(30) Foreign Application Priority Data

Sep. 6, 2017 (GB) ..................................... 1714346

(51) Int. Cl.
| | |
|---|---|
| *G06F 1/28* | (2006.01) |
| *G06F 1/3287* | (2019.01) |
| *G06F 1/3209* | (2019.01) |
| *G06F 11/30* | (2006.01) |
| *G06F 1/3296* | (2019.01) |

(52) U.S. Cl.
CPC .............. *G06F 1/28* (2013.01); *G06F 1/3209* (2013.01); *G06F 1/3287* (2013.01); *G06F 1/3296* (2013.01); *G06F 11/3062* (2013.01)

(58) Field of Classification Search
CPC .... G06F 1/3287; G06F 1/3203; G06F 1/3234; G06F 1/325; G06F 1/28; G06F 11/3062
See application file for complete search history.

(56) References Cited

U.S. PATENT DOCUMENTS

| | | | | |
|---|---|---|---|---|
| 9,098,270 | B1 * | 8/2015 | Tiyyagura | ............. G06F 1/3203 |
| 9,411,390 | B2 * | 8/2016 | Smith | .................... G06F 1/3203 |
| 9,557,792 | B1 * | 1/2017 | Potlapally | ............. G06F 1/3206 |
| 9,658,675 | B1 | 5/2017 | Witek et al. | |
| 2011/0248865 | A1 * | 10/2011 | Hong | .................... G01S 7/4913 340/870.07 |
| 2013/0073878 | A1 * | 3/2013 | Jayasimha | ............ G06F 1/3287 713/300 |
| 2016/0091944 | A1 | 3/2016 | Malmberg et al. | |
| 2016/0231805 | A1 * | 8/2016 | Culshaw | ................ G06F 1/3287 |
| 2017/0177870 | A1 * | 6/2017 | Hildebrand | ............. G06F 21/81 |

OTHER PUBLICATIONS

Combined Search and Examination Report for GB1714346.2 dated Jan. 30, 2018, 6 pages.

\* cited by examiner

*Primary Examiner* — Jigar P Patel
(74) *Attorney, Agent, or Firm* — Nixon & Vanderhye P.C.

(57) ABSTRACT

An integrated circuit comprises first and second power domains, and a message handling unit to control passing of messages sent from a sender device in the first power domain to a receiver device in the second power domain. The message handling unit writes messages sent from the sender device to a message storage area, provided in the second power domain. The message handling unit is responsive to a message send request from the sender device requesting sending of at least one message to the receiver device when at least one device in the second power domain is in a quiescent state, to transmit a wakeup request to a second domain power controller to request that said at least one device in the second power domain transitions from the quiescent state to an awake state.

18 Claims, 9 Drawing Sheets

US 10,948,963 B2

MESSAGE HANDLING UNIT

This application claims priority to GB Patent Application No. 1714346.2 filed Sep. 6, 2017, the entire contents of which are hereby incorporated by reference.

The present technique relates to the field of integrated circuits. More particularly, it relates to passing of messages from a sender device in a first power domain to a receiver device in a second power domain.

An integrated circuit may comprise a number of domains which may have independent power controllers for separately controlling power states within the respective domains. For example each power controller may control a voltage supply or a clock supply depending on the current power state of the corresponding domain. Providing separate power domains enables certain portions of the integrated circuit to be placed in a lower power state to save power while other portions of the integrated circuit remain operational. However, implementing separate power domains makes passing of messages from a sender in one domain to a receiver in another domain more complex.

At least some examples provide an integrated circuit comprising:
  a first power domain;
  a second power domain; and
  a message handling unit to control passing of messages sent from a sender device in the first power domain to a receiver device in the second power domain;
  the message handling unit configured to write messages sent from the sender device to a message storage area provided in the second power domain;
  wherein the message handling unit is responsive to a message send request from the sender device requesting sending of at least one message to the receiver device when at least one device in the second power domain is in a quiescent state, to transmit a wakeup request to a second domain power controller to request that said at least one device in the second power domain transitions from the quiescent state to an awake state.

At least some examples provide a message handling unit to control passing of messages sent from a sender device in a first power domain of an integrated circuit to a receiver device in a second power domain of the integrated circuit, the message handling unit comprising:
  message passing circuitry to configured to write messages sent from the sender device to a message storage area provided in the second power domain; and
  wakeup requesting circuitry responsive to a message send request from the sender device requesting sending of at least one message to the receiver device when at least one device in the second power domain is in a quiescent state, to transmit a wakeup request to a second domain power controller to request that said at least one device in the second power domain transitions from the quiescent state to an awake state.

At least some examples provide a method for controlling passing of messages in an integrated circuit comprising a first power domain and a second power domain; the method comprising:
  receiving a message send request from a sender device in the first power domain requesting sending of at least one message to the receiver device, at a message handling unit for controlling passing of messages sent from the sender device in the first power domain to the receiver device in the second power domain, wherein the message handling unit is configured to write messages sent from the sender device to a message storage area provided in the second power domain; and
  in response to receipt of the message send request when at least one device in the second power domain is in a quiescent state, transmitting a wakeup request to a second domain power controller to request that said at least one device in the second power domain transitions from the quiescent state to an awake state.

Further aspects, features and advantages of the present technique will be apparent from the following description of examples, which is to be read in conjunction with the accompanying drawings, in which.

Figure 1:
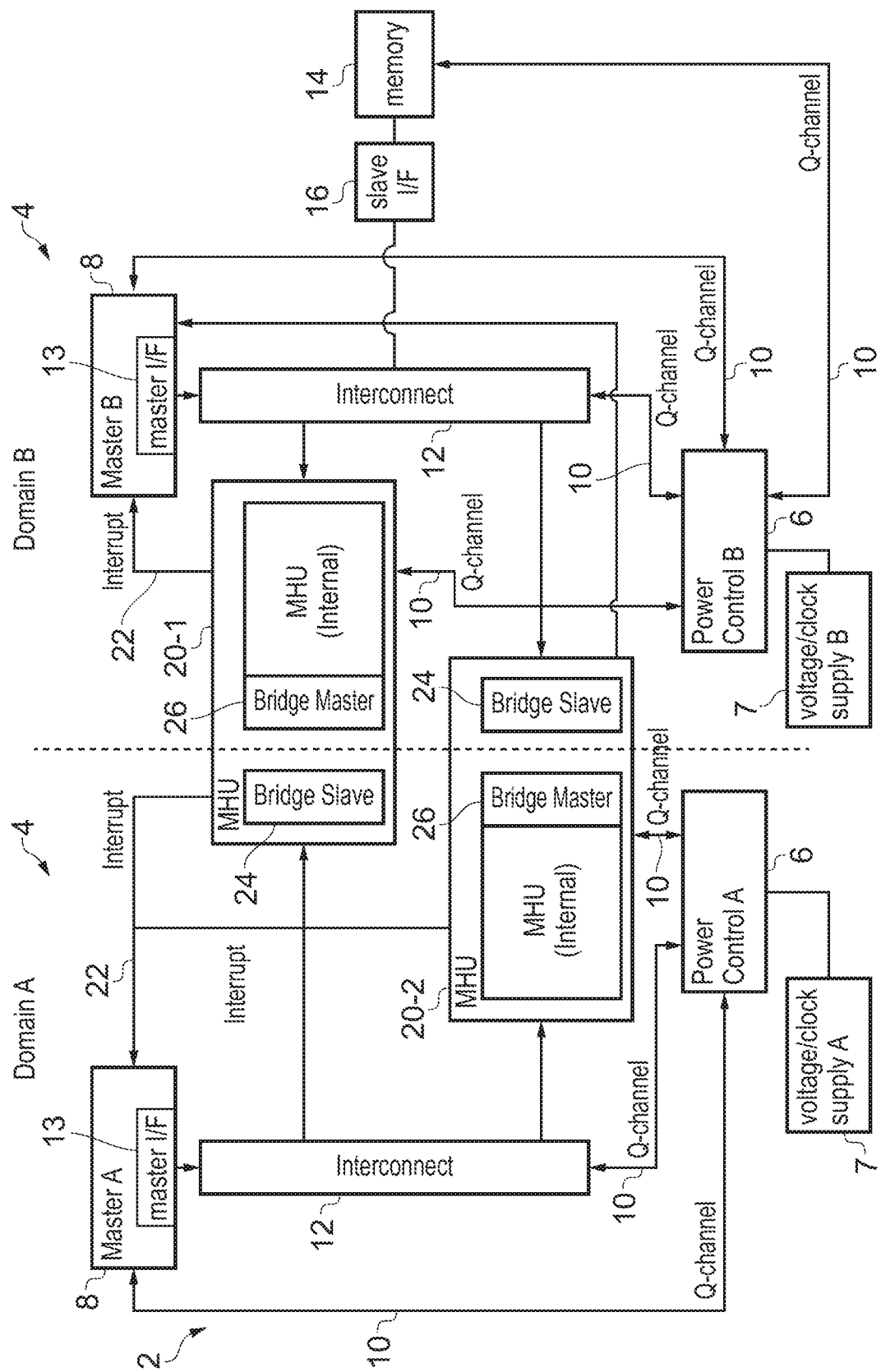
FIG. 1 illustrates an example of an integrated circuit comprising a message handling unit for handling passing of messages from a sender in a first power domain to a receiver in a second power domain.

In an integrated circuit comprising multiple power domains, a typical approach for handling messages sent from one domain to another domain may be to provide a (relatively) always on shared message area which is implemented outside the first and second domains themselves, which is powered any time at least one of the sender/receiver domain is powered, so that the shared message area is guaranteed to be available as a mailbox for received messages from one domain regardless of whether the other domain is currently in an awake state or a quiescent state. A disadvantage with providing a shared mailbox in a permanently powered domain is that system resets or other events which may cause the sender or recipient device to power down may leave partially completed transactions within the shared mailbox area which could break protocol when parts of the system subsequently are powered up again. Also, the always on shared mailbox may increase power consumption.

In the technique discussed below, a message handling unit is provided to control passing of messages sent from a sender device in the first power domain to a receiving device in the second power domain. The message handling unit is configured to write messages sent from the sender device to a message storage area provided in the second power domain. The message handling unit is responsive to a message send request from the sender device requesting sending of at least one message to the receiver device when at least one device in the second power device is in a quiescent state, to transmit a wake up request to a second domain power controller to request that the at least one device in the second power domain is transitioned from the quiescent state to an awake state. As the message storage area is implemented in the second power domain, but the message handling unit has a mechanism for requesting a wakeup of at least one device in the second domain when required to receive a message from the first domain, it is not necessary to provide a shared mailbox in an always on domain which is guaranteed to be available. This saves power and makes dealing with cases when messages are partially completed when a change of power state occurs less complex.

The first and second power domains may be any domains which may be placed in independent power states. The different power states can be controlled by varying the voltage supply, or the clock supply, or both the voltage and clock supplies, or by other means. For example, the first and second power domains may comprise different voltage domains (having independent control of voltage supply to the respective domains), or different clock domains (having independent control of clock signals to the respective domains).

The quiescent state may be a state in which correct or normal operation of a device in the second power domain cannot be guaranteed. The awake state may be a state in which correct or normal operation of the devices in the second power domain is to be expected.

In some examples, the quiescent state may be a state in which a voltage supply or clock supply to a device in the second power domain is reduced, suspended or withdrawn.

However, in other examples, the quiescent state could be a state of a device in which the voltage supply or clock supply is allowed to be suspended or withdrawn, but whether the voltage supply or clock supply is actually suspended to the device may depend on other factors. Hence, it is possible that the voltage or clock signal could still be supplied to a device in the quiescent state in the same way as if the device was in the awake state. For example, this approach can be useful for a system where multiple devices share a voltage/clock supply but have independent channels for accepting/denying requests to transition to a different power state. For example, a power controller may request that a number of devices transition to a quiescent state ready to be powered down, but some devices may be performing a non-interruptible operation and so may deny the request to change states. Even if other devices accept the request to transition to the quiescent state, as they share a common voltage or clock supply with the devices which denied the requested quiescent state entry, this means some devices may be in the quiescent state but may still have the clock/voltage supply enabled. Hence, the quiescent state may in some examples simply be a state in which the device is ready to have the supply of the power or clock signal withdrawn. When a device in the second domain is in the quiescent state, the sender device in the first domain cannot guarantee that the device will respond correctly to messages.

Which devices are requested to transition from the quiescent state to the awake state when the sender device in the first power domain wishes to send a message can vary from embodiment to embodiment. In general, the at least one device to be woken up may be any device required in order to enable the message passing protocol to be carried out successfully.

In some examples, the at least one device to be woken up could comprise the receiver device itself. For example, the wakeup request could identify which particular device is the receiver to enable the second domain power controller to identify the appropriate device to transition to the awake state. In some examples, the at least one device of the second power domain could comprise all devices of the second power domain. Hence, the wakeup request could simply request that the second domain power controller transitions all devices in the second power domain from the quiescent state to the awake state. In another example, the at least one device of the second power domain could also comprise an interconnect of the second domain which manages coherency in data accesses between a number of devices within the second domain, and is used for routing transactions to memory.

In some cases, the at least one device in the second power domain may comprise a portion of the message handling unit which is implemented in the second power domain (referred to as the "second domain MHU portion" below). Even if the recipient device itself, the message storage area, or an interconnect or other device used for routing the message to the recipient device or the shared message storage area, is in the quiescent state at the time when the message is sent from the sender device in the first domain, if at least the second domain MHU portion is in the awake state at the time the message is received, this may be enough to allow a message handling protocol to be implemented safely. For example, once the second domain MHU portion is awake, it could request a write to the shared message storage area or a location within the recipient device, and even if the shared message storage area, recipient device or interconnect is not already awake, the write request itself could trigger a wakeup request to the second domain power controller to wake up that other device. Therefore, it is not necessary for the message handling unit itself to explicitly send a signal to the power controller requesting that other devices (e.g. the recipient, interconnect or the shared message storage area) are woken up.

Hence, in some cases the receipt of the message send request from the sender device may trigger a wakeup request to the second domain power controller to request a transition of the second domain MHU portion from the awake state to the quiescent state, but the wakeup request may not directly affect whether other devices in the second domain exit the quiescent state (although those other devices could still be indirectly affected because once the second domain MHU portion is back in the awake state then further actions taken by the second domain MHU portion may lead to those other devices being woken from the quiescent state).

In summary, it is not essential for the wakeup request to trigger all devices in the second domain to transition from the quiescent state to the awake state, and there are a number of different ways in which the wakeup request could be implemented.

The message storage area in the second domain may vary in location. In some cases, the message storage area may comprise registers within the message handling unit itself, in a portion of the message handling unit implemented in the second power domain. For example, the message handling unit may comprise a number of message status registers within the second domain MHU portion, and the message payload could be written directly to a message status register or to multiple message status registers if messages greater than the size of one register are required.

Alternatively, the message storage area could be provided in a memory or storage device implemented in the second domain, outside the message handling unit itself. For example, the messages could be written to a shared memory device which is also used for purposes other than message passing. In some cases, the address range of the message storage region in the memory could be predefined, so that when a message is to be sent, the message handling unit writes the message payload to the predefined region of the address space. Alternatively, the message payload could specify an address pointer, and the message handling unit may deposit the message payload into the memory region identified by the address pointer, so that the location at which the message is written can be varied from message to message.

The message handling unit may have a sender storage area provided in the first power domain, for storing control data associated with sending of messages to a receiver device. For example, the sender storage area may comprise any one or more of the following:
- at least one register for storing configuration data for configuring the operation of the message handling unit;
- a register representing whether the message send request is asserted or deasserted (which can be written to by the sender device to trigger the message send request);
- a receiver ready register representing whether the at least one device in the second power domain (e.g. the second domain MHU portion) is in the awake state ready to receive messages;
- message status information representing the status of messages sent by the sender device (alternatively such information could be stored in a portion of the message handling unit implemented in the second domain to allow more convenient access by the receiver which may update message status based on the progress of the receiver in reading the messages).

The message handling unit may return an error indication to the sender device in response to the sender device accessing the sender storage area when the at least one device of the second power domain is in the quiescent state. This enables the message handling unit to make the sender device aware if continuing to proceed with the protocol for sending messages to the second power domain would likely be unsuccessful because the at least one device of the second power domain is in the quiescent state. For example, this enables the message handling unit to deal with situations in which, after the at least one device in the second power domain transitioned from the quiescent state to the awake state in response to the wakeup request, the at least one device transitions back to the quiescent state before the message sending protocol has been completed for all the messages sent by the sender device.

The message handling unit may return an error indication to the sender device when the at least one device in the second power domain fails to be transitioned from the quiescent state to the awake state in response to the wakeup request. Hence, while the message handling unit may transmit a wakeup request to request a transition from the quiescent state to the awake state, this is merely a request (not a guarantee) that the device actually wakes up, and it may not be compulsory for the second domain power controller to actually trigger a wake up. In some cases, the wakeup request may be ignored. The message handling unit may provide a mechanism for recognising when the wake up request has been ignored. For example the message handling unit could implement a timeout mechanism. If after a certain period of time after sending the wakeup request, no indication has been received from the second power domain that the at least one device in the second power domain is in the awake state, then an error indication can be sent to the sender device to inform the sender device that the message send request has been unsuccessful. The sender device may then be aware that the message sending has failed and may reattempt to send the message later.

The message handling unit may set an access ready parameter (e.g. in one of the registers of the sender storage area) to a first value in response to detecting that the at least one device of the second power domain has transitioned from the quiescent state to the awake state in response to the wakeup request. For example, the access ready parameter can be read by the sender device to determine whether it is safe to request writing of messages to the message storage area in the second power domain.

The message handling unit may set the access ready parameter to a second value in response to detecting a transition of the at least one device of the second power domain from the awake state to the quiescent state. When the access ready parameter has the second value, the message handling unit may return an error indication to the sender device in response to the sender device accessing the sender storage area. This provides a mechanism for enabling the sender device to recognise when the at least one device in the second device has transitioned back to the quiescent state after previously being awake, so that it can recognise that the message may not have been correctly received.

Following transmittal of the wakeup request from the message handling unit to the second domain power controller, the sending device may defer writing of at least one message to the message storage area in the second power domain until the message handling unit has indicated that the at least one device in the second power domain has transitioned from the quiescent state to the awake state in response to the wake up request. There are different ways in which the sender device could determine from information provided by the message handling unit whether the at least one device in the second power domain has transitioned to the awake state. In one example, the message handling unit may provide an interrupt signal to the sender device in response to detecting that the at least one device in the second power domain has transitioned from the quiescent state to the awake state in response to the wakeup request. In another example, the sender device could poll (periodically read) an access ready parameter maintained by the message handling unit indicating whether the at least one device in the second power domain is in the quiescent state. Either way, by first sending a message send request, and then deferring writing of messages to the message storage area in the second power domain until it is determined that the at least one device in the second power domain is in the awake state, this avoids the need to provide a shared "always on" message storage area providing guaranteed storage.

Following the transition of the at least one device in the second domain from the quiescent state to the awake state in response to the wakeup request, the second domain power controller may deny a request to transition the at least one device in the second power domain from the awake state to the quiescent state while the wakeup request from the message handling unit remains asserted. This reduces the likelihood of the second domain power controller triggering a transition back to the quiescent state while the sender is still writing messages to the message storage area in the second power domain, to reduce the chance that messages are lost. The message handling unit may maintain assertion of the wakeup request until the sender device has deasserted the message send request. The sender device may deassert the message send request following completion of writing of at least one message to the message storage area. In particular, the sender may deassert the message send request after writing the final message to the message storage area. This prevents the at least one device in the second power domain transitioning back to the quiescent state until the sender has finished writing messages.

Nevertheless, it is still possible that after the last message has been written, the at least one device in the second power domain may transition back to the quiescent state or may be reset before all the messages have been read from the message storage area in the second power domain. Hence, at least one partially completed message may remain pending in the message storage area at the time of the reset or power down transition. In response to a reset or transition of the at least one device to the quiescent state, when at least one partially completed message remains pending in the message storage area, a portion of the message handling unit operating in the first power domain may trigger completion of processing of the at least one partially completed message. For example the message handling unit may provide a response to the sender device in the first power domain which brings the protocol associated with sending a message to an end, rather than leaving it partially incomplete. For example, the portion of the message handling unit in the first power domain could return an error indication to the sender device in response to at least one partially completed message. Hence, the sender device can be aware that the sending of the message failed and can therefore re-attempt to send the message later. This avoids the need for the at least one device in the second domain to resume processing of partially completed messages when it later exits reset or transitions back to the awake state, which makes it less complex to ensure that hazards caused by an unexpected power transition or reset can be avoided. Also, this enables the message storage area in the second domain to be powered down to save power, even if it is possible that this could lead to loss of data associated with the partially completed message. The sender device can restart sending of the partially completed messages later by restarting the protocol from the beginning, e.g. by sending another message send request.

The message handling unit may be incapable of handling messages sent from a sender device in the second power domain to a receiver device in the first power domain. Hence the message handling unit may be a unidirectional message handling unit. This can simplify the design of the message handling unit and improve scalability to increasing numbers of power domains. If messages also need to be sent in the opposite direction, then a second message handling unit may be provided to control passing of messages sent from a sender device in the second domain to a receiver device in the first power domain.

Also, in systems which comprise a third power domain, a common sender portion of the message handling unit in the first power domain may communicate with both a second domain receiver interface for requesting writing of messages to the message storage area in the second power domain, and with a third domain receiver interface for requesting writing of messages to a further message storage area in the third power domain to handle messages sent from the sender device in the first domain to a receiver device in the third power domain. If there are four or more domains then further receiver interfaces could be provided for each additional domain. Hence, a common portion in the first domain can communicate with the receiver interfaces for each other domain according to the techniques discussed above. This avoids the need for separate sender-receiver interface pairs for each respective pair of domains, as a common sender portion is shared between receiver portions for multiple domains, improving scalability. A selector within the common sender portion of the message handling unit may select between the second and third domain receiver interface based on receiver identifying information provided by the sender device in the first power domain.

FIG. 1 schematically illustrates an example of an integrated circuit 2 (e.g. a system on chip) comprising a number of power domains 4, labelled A and B in this example. Each domain 4 has a power controller 6 for controlling power states of various devices 8, 12, 14, 26 within the corresponding domain. For example, the power controller 6 may control transitions of each device between an awake state in which the power/clock supply 7 to the corresponding device is guaranteed and a quiescent state in which the device 8 is in a state ready for the power or clock supply to the device to be turned off or reduced. Alternatively, some systems may operate with a power controller supporting more than two different power states with different levels of power consumption, e.g. with three or more different levels of voltage supply or different power/clock gating states. A respective power management channel 10 is provided between the power controller 6 and each device 8, 12, 14, 26 to be controlled. The power management channel 10 carries one or more power management signals, e.g. a request signal sent from the power controller 6 to the device 8, 12, 14, 26 requesting that the device transitions to a certain power state, or one or more signals sent from the controlled device 8, 12, 14, 26 to the power controller 6 for accepting or denying requests to change power state, or for indicating a preference for operating in a particular power state. In general, the voltage supply or clock supply 7 to a particular domain may be terminated or gated when all of the devices 8, 12, 14, 26 supplied from that voltage supply or clock supply have entered the quiescent state. If any device transitions 8, 12, 14, 26 within a given domain transitions back from the quiescent state to the awake state, the voltage or clock supply 7 to that domain may be resumed.

Each domain has at least one bus master device 8, such as a processor, graphics processing unit, or direct memory access controller, and an interconnect 12 for managing coherency between data cached in a given master device 8 and data cached in other masters or stored in memory 14. While FIG. 1 shows only one master device 8 per domain for conciseness, it will be appreciated that each domain could have multiple bus masters 8. Each master device 8 has a master bus interface 13 for managing interaction with the interconnect 12 according to the coherency protocol specified for the interconnect. Each slave device coupled to the interconnect 12 has a corresponding bus slave interface 16 for interacting with the interconnect 12 according to the coherency protocol. For example a master device 8 can write data to the memory 14 by controlling its master interface 12 to assert a write request on the interconnect 12. In response to the write, the interconnect 12 may trigger snoop operations if necessary to establish the location of other cached data relating to the same address, and depending on the coherency protocol may invalidate data cached in other masters if it is now out of date in view of the write from the master 8 to memory 14. Similarly, on a read initiated by a master device 8, the interconnect 12 may snoop other masters in case dirty data for the same address is cached in another master. Some devices may act as both master devices (which initiate read/write transactions) and slave devices (which respond to read/write transactions). The power controller 6 may control the power state of the master device 8, the interconnect 12 and memory 14, using corresponding power management channels 10. While for conciseness the memory 14 is shown only in domain B in the example of FIG. 1, a memory could also be provided in domain A.

Hence, power domains A and B have independent voltage or clock supplies so that one domain can remain operational while the other is powered down, or vice versa. However, providing separate domains within an integrated circuit 2 or system on chip makes passing of messages between domains more complex. As shown in FIG. 1, at least one message handling unit 20 is provided to bridge across the domains and handle message passing between the domains. Each message handling unit 20 passes messages in a single direction from a sender device to a receiver device. For example, in FIG. 1 the message handling unit 20-1 passes messages from a sender device in domain A to a receiver device in domain B and message handling unit 20-2 passes messages from a sender device in domain B to a receiver device in domain A. The message handling unit 20 may act as a memory-mapped peripheral connected to the interconnects 12 in the respective domains. The message handling unit 20 handles writing of messages to a message storage area which may be provided within the receiver domain portion of the message handling unit 20, or may be located within a memory 14 implemented in the receiver domain. The message handling unit provides a mechanism to assert interrupt signals 22 to facilitate inter-processor message passing, and also triggers power transitions of at least one device in the recipient domain from a quiescent state to an awake state when a message is to be sent from the sender domain.

Figure 2:
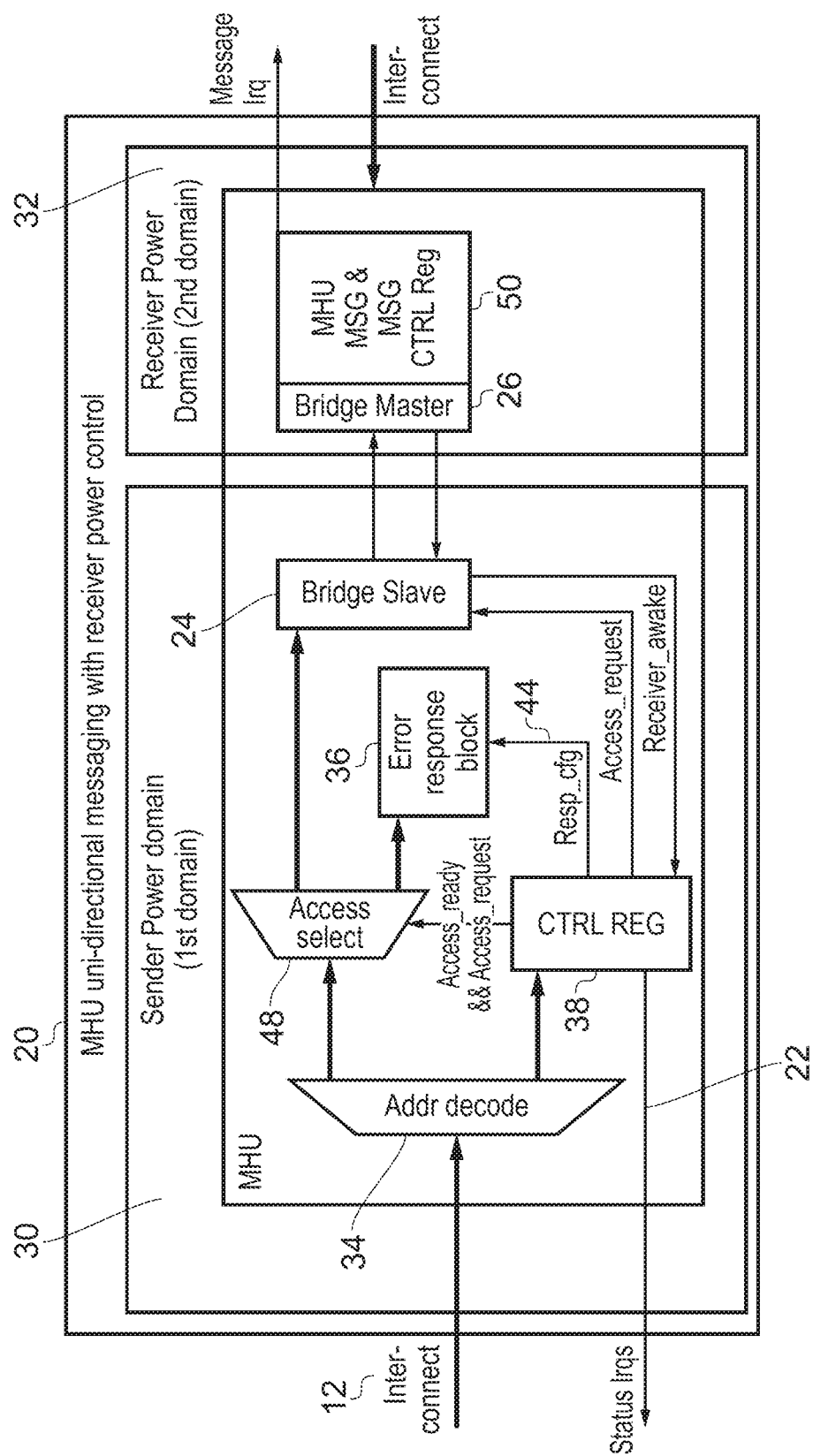
FIG. 2 shows the message handling unit in more detail.

FIG. 2 shows an example of one of the message handling units 20 in more detail. It will be appreciated that this could be either the MHU 20-1 or MHU 20-2 shown in FIG. 1. The MHU 20 includes a sender MHU portion 30 provided in the sender power domain and a receiver MHU portion 32 provided in the receiver power domain. For MHU 20-1, the sender domain (first domain) is domain A and the receiver domain (second domain) is domain B, and for MHU 20-2 the sender domain is domain B and the receiver domain is domain A. The receiver MHU portion 32 is one of the devices that is controlled by the power controller 6 using one of the power management channels 10. Each message handling unit (MHU) 20 has a bridge slave interface 24 implemented in the sender MHU portion 30, which acts as a slave device on the interconnect 12 within the sender domain (similar to the slave interface 16 of the memory 14), and a bridge master device 26 implemented in the receiver MHU portion 32, which acts as a master device on the interconnect 12 within the receiver domain (similar to the master interface 13 of the bus master device 8).

The sender device in the sender domain interacts with the MHU by issuing write transactions to the interconnect, specifying a target address which is mapped to control registers within one of the sender or receiver MHU portions 30, 32 of the MHU 20. The write transactions are routed to the MHU 20 by the interconnect 12. The MHU bridge master 26 in the receiver MHU portion 26 may trigger writes to the message storage area by writing direct to its internal registers 50 or by issuing a write request on the interconnect 12 specifying a memory address mapped to the message storage area. Also, the recipient device (e.g. master device 8) in the receiver domain can read information from control registers 50 of the receiver MHU portion 32 by issuing read requests to the interconnect 12 specifying a memory address mapped to the corresponding control register 50.

In the sender MHU portion 30, transactions received from the interconnect 12 are sent to an address decoder 34 which decodes the target address of the transactions and selects whether to direct the transactions to one of: the bridge slave interface 24 for interacting with the receiver MHU portion 32, an error response block 36 for handling cases when the receiver MHU portion 32 is in a quiescent state, and a set of sender control registers 38 for storing control data associated with sending of messaging to the receiver domain.

Figure 3:
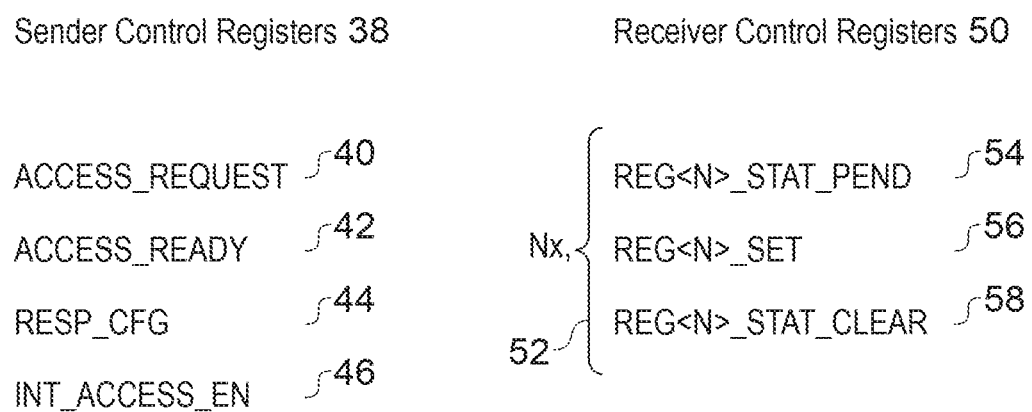
FIG. 3 shows an example of control registers in the message handling unit.

FIG. 3 shows an example of contents of the sender control registers 38. It will be appreciated that these are just some examples of possible registers which may be provided, and in practice other information could also be stored in the sender control registers 38. In this example, the sender control registers 38 specify:
ACCESS_REQUEST 40: an access request parameter which can be written by the sender device to request access to the receiver domain for sending a message. The setting of the access request register 40 by the sender device represents sending of a message send request.
ACCESS_READY 42: an access ready parameter indicating whether the receiver MHU portion 32 is in a quiescent state.
RESP_CFG 44: a response configuration register for storing control data for configuring how the MHU 20 should respond to cases when an error occurs during sending of a message to the receiver domain (e.g. errors triggered when the receiver domain is in the quiescent state when the message needs to be sent). For example, the RESP_CFG 44 register could specify whether to generate an interrupt to the sender device when an error is detected.
$INT_{13}$ ACCESS_EN 46: an interrupt access enable register 46 which stores an interrupt access enable value which controls whether the MHU 20 will interrupt the sender device upon detecting a transition in the ACCESS_READY parameter 42.

Each of these registers may be mapped to a corresponding memory address so that they can be read/written by the sender device. Some registers (e.g. ACCESS_READY) may be defined as read only from the point of view of the sender device, being updatable only by the hardware within the MHU 20. Other registers (e.g. ACCESS_REQUEST 40, RESP_CFG 44, INT_ACCESS_EN 46) may be both readable and writable by the sender device.

Hence, transactions sent by the sender device which specify the address mapped to one of the control registers 38 are directed to the control registers by the address decoder 34. On the other hand, other addresses mapped to the MHU 20 correspond to locations at the receiver MHU portion 32 and so these transactions are provided to access selector 48. The access selector 48 selects whether to direct the transactions to the bridge slave interface 24 or to the error response block 36, in dependence on the ACCESS_READY 42 and ACCESS_REQUEST 40 values in the control registers 38. If the ACCESS_REQUEST register 40 has been set in response to a message send request from the sender device, and the receiver MHU portion 32 is determined to be ready for access (not in quiescent state) as indicated by the access ready register 42, then the transaction from the sender device is directed to the bridge slave 24, while otherwise the error response block 36 handles the transaction. The error response block 36 determines, based on the value stored in the RESP_CFG 44 register, how to handle cases when the receiver MHU portion 32 is in the quiescent state. For example, the transaction could simply be ignored, or alternatively an interrupt signal may be sent to the sender device.

The receiver MHU portion 32 comprises receiver message handling registers 50 for storing information relating to the sending of messages, for example message status information. For example, as shown in FIG. 3 the receiver control registers 50 may include N sets of message registers 52, one set of registers or each message, with each set 52 of message registers including a message status register 54 for storing message status information on a particular message, a message setting register 56 for which a write to the message setting register 56 signals that a new message has been written, and a message clear register 58 which can be written to by the receiver device to indicate that the corresponding message has been read.

Figure 4:
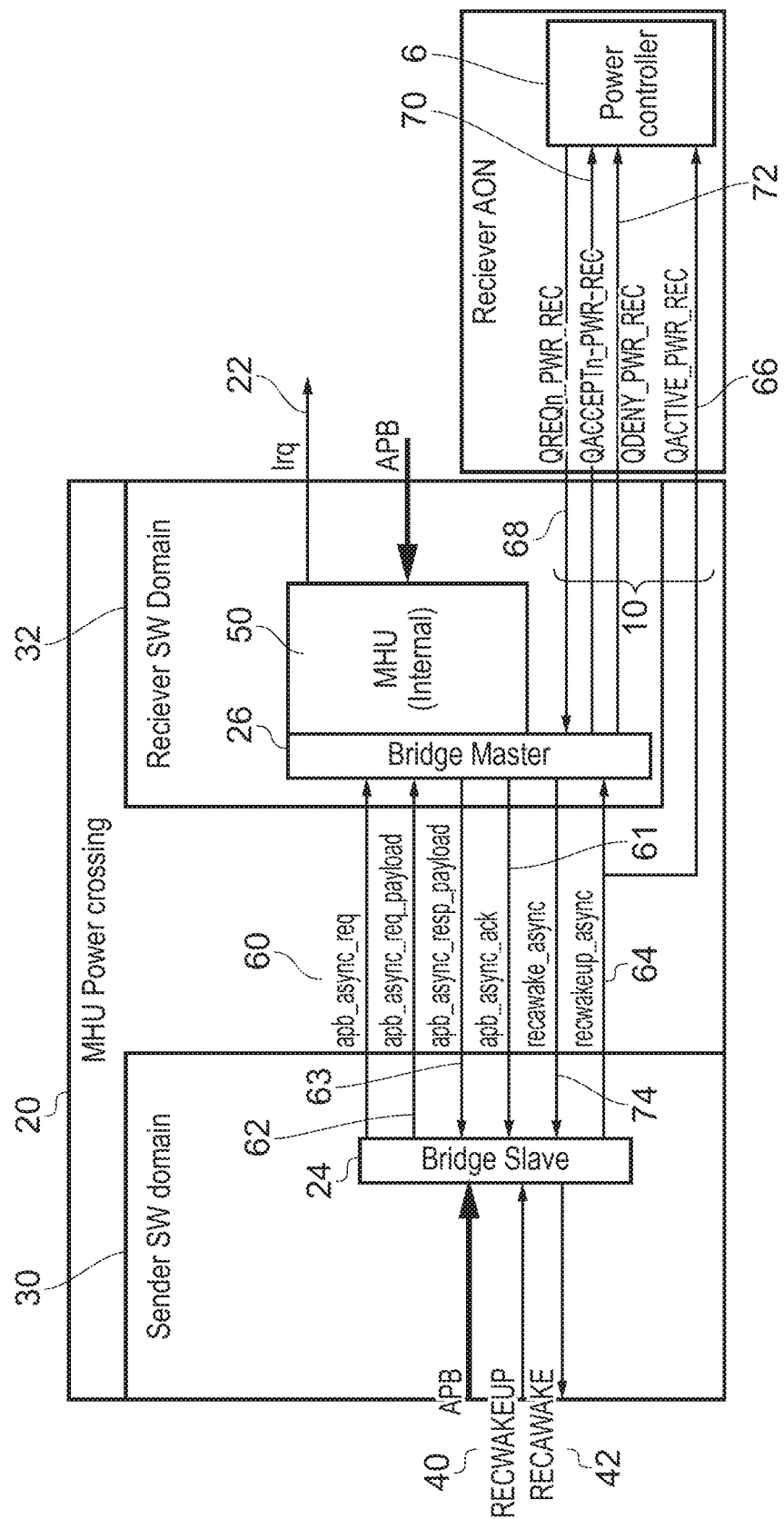
FIG. 4 shows an example of signals exchanged between sender and receiver portions of the message handling unit.

FIG. 4 shows an example of signals exchanged between the sender and receiver portions 30, 32 of the MHU 20 in more detail. The bridge interface includes a set of request 60 and acknowledge signals 61 used by the sender side to request sending of a message and by the receiver side to acknowledge receipt of the message respectively, and message payload and response payload signals 62, 63 for providing the contents of a message or a response. For messages with a relatively small payload, the payload of the message could be stored in the corresponding message status register 54 alongside the message status. If larger messages need to be sent, multiple message status registers 52 could be used to store a single combined message (e.g. mask information stored in the message handling registers 50 could specify how the message status registers 52 should be grouped together and interpreted as a single larger message). Alternatively, the message payload could be written to a region in memory 14 in the receiver domain. The address of the message storage region could be implicit (with a pre-defined region of memory being used for message passing), or explicitly specified in the message payload.

As shown in FIG. 4 the bridge interface also includes a receiver wakeup signal 64 which is sent from the bridge slave interface 24 to the bridge master interface 26 when the message send request is written to the access request register 40 by the sender to trigger a wake up of the receiver domain. Assertion of the receiver wakeup signal 64 triggers a wakeup request 66 (QACTIVE) to be sent to the power controller 6 associated with the receiver domain, to request that the power controller 6 wakes up the receiver MHU portion 32 from the quiescent state to an awake state, or that the receiver MHU portion 32 is maintained in the awake state if it is already awake. Hence, the bridge slave 24 acts as wakeup requesting circuitry in the MHU 20. The QACTIVE line of the power management channel is coupled to the wakeup signal line 64 of the channel between the sender and receiver MHU portions 30, 32, so that even if the receiver MHU portion 32 is in the quiescent state, the wakeup request 66 can still be triggered without requiring active control by the receiver MHU portion 32. The wakeup request 66 need not necessarily be acted upon by the power controller 6. If the power controller 6 does act upon the request, then it sends a power transition request signal 68 (QREQ) to the receiver MHU portion 32 requesting that the receiver MHU portion 32 wakes up from the quiescent state to the awake state.

The interface between the bridge master 26 and the power controller 6 on the power management channel 10 also includes an accept signal (QACCEPT) 70 and a deny signal (QDENY) 72 sent from the bridge master 26 to the power controller 6, which the bridge master 26 can use to respond to the power transition request signal 68 to accept or deny a request to transition back from the awake state to the quiescent state. The bridge master 26 may deny a request for a transition to the quiescent state when the wakeup request 64 from the sender MHU portion 30 is still asserted. The signals on the power management channel 10 shown in FIG. 4 are just one example of how the power controller 6 could control the power state of the bridge master 26. Other power management protocols could also be used (e.g. with more complex signalling to control transitions between two or more power states).

Figure 5A:
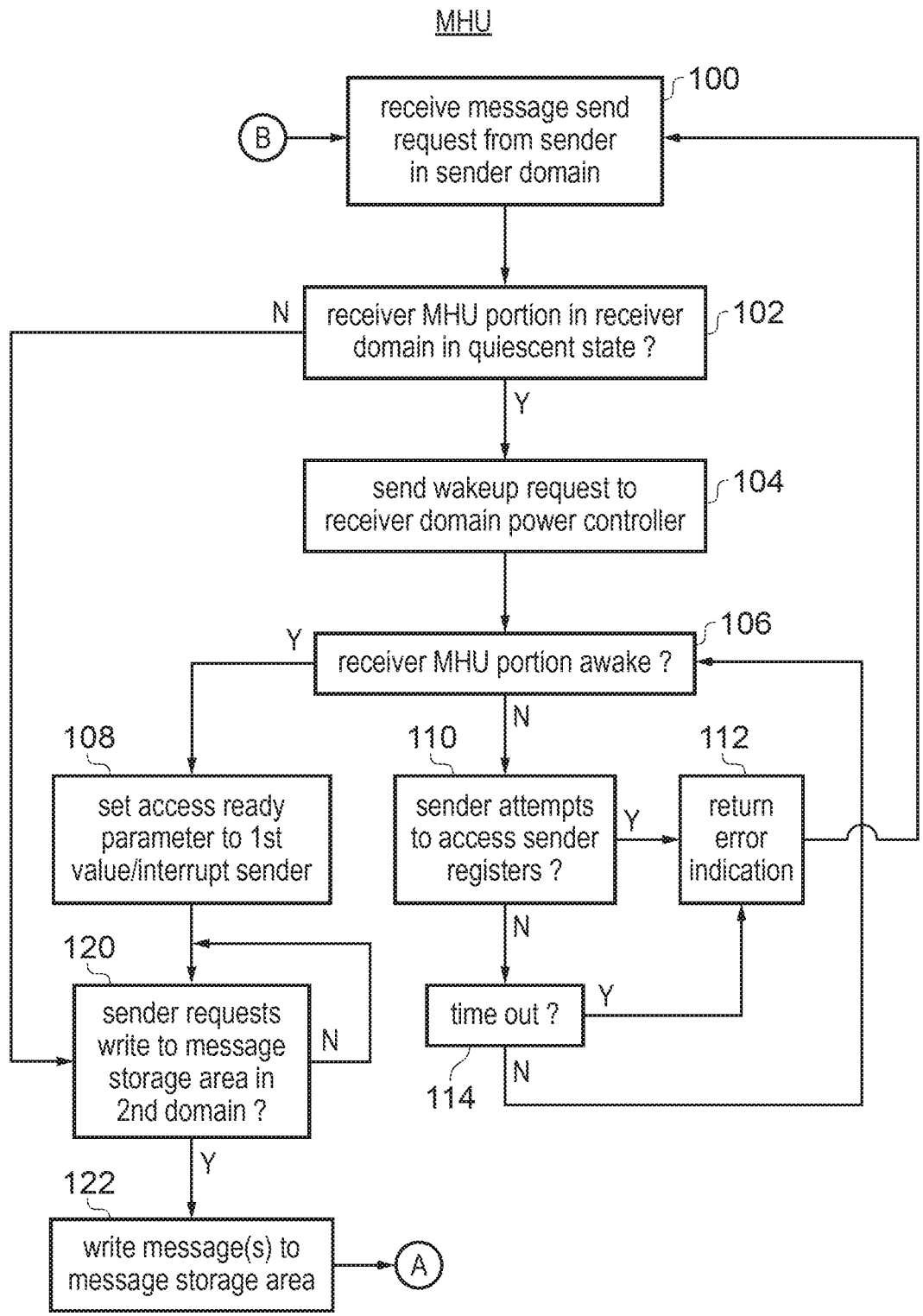
FIGS. 5A and 5B show a flow diagram illustrating a method of handling messages passed from a sender in a first domain to a receiver in a second domain.
Figure 5B:
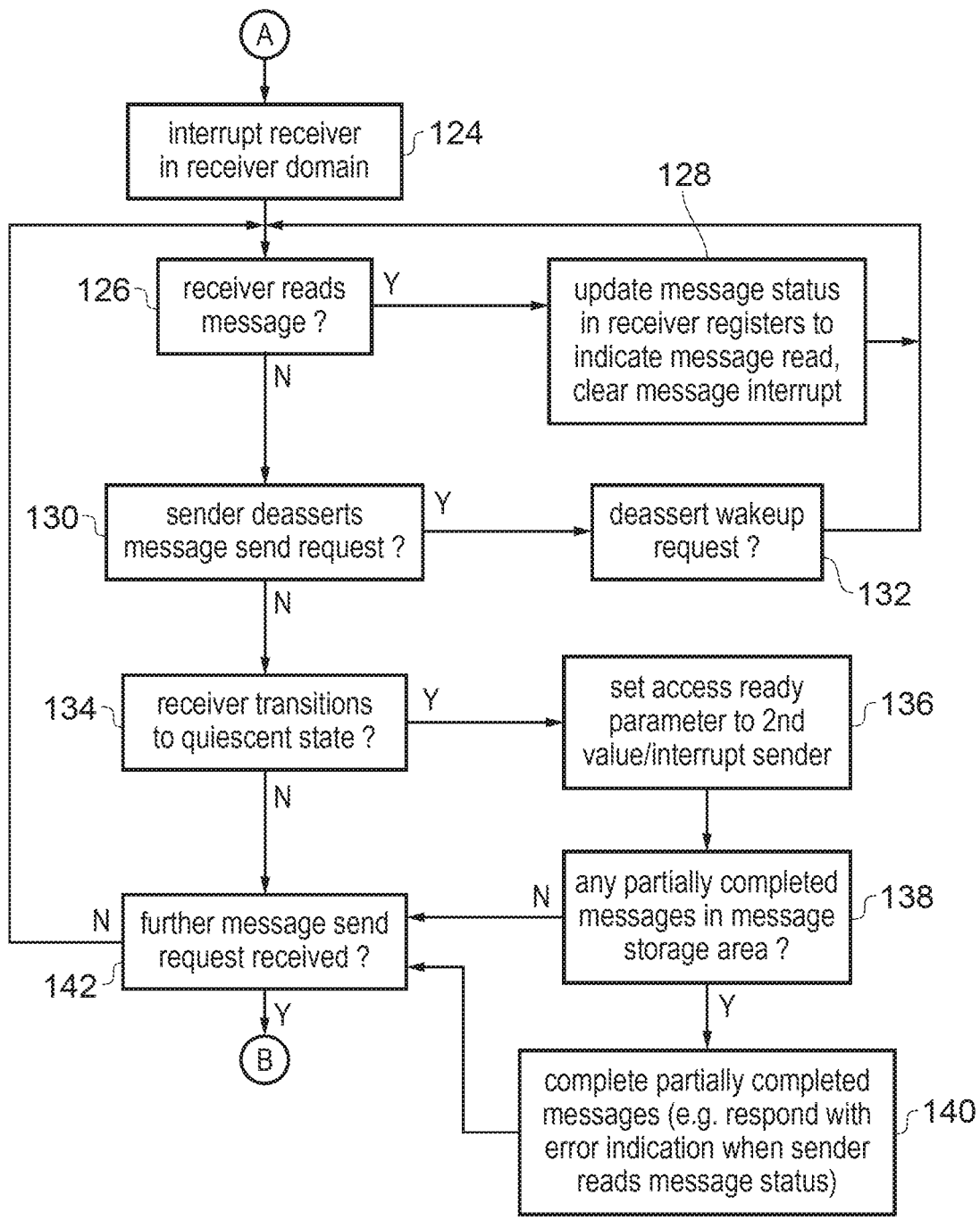

FIGS. 5A and 5B together illustrate a flow diagram illustrating a method of handling message sending from a sender device in a first domain to a receiver device in a second domain. For ease of explanation, in this example the sender domain is considered to be domain A and the receiver domain is domain B (and so MHU 20-1 is the message handling unit used for sending of the message), but it could also be the other way round in which case MHU 20-2 would be used for sending a message from domain B to domain A.

At step 100 a sender device in the sender domain A sends a message send request to the MHU 20-1. The message send request comprises a memory mapped write transaction specifying the address corresponding to the ACCESS_REQUEST register 40. In response to the message send request, at step 102 the sender MHU portion 30 determines (based on the ACCESS_READY parameter 42) whether the receiver MHU portion 32 of the MHU 20-1 is in the quiescent state. If so, then at step 104 a wakeup request 64 is sent to the receiver MHU portion 32, which also triggers a corresponding wakeup request 66 to the power controller 6 in the receiver power domain B. At step 106, the sender MHU portion 30 of MHU 20-1 determines whether the receiver MHU portion 32 has indicated that it is awake using an awake signal (recawake_async) 74 sent from the bridge master 26 to the bridge slave 24 as shown in FIG. 4. When the receiver portion 32 of the MHU has indicated that it is awake, then at step 108 the ACCESS_READY parameter 42 is set to a first value (e.g. 1) in the sender control registers 38. Depending on whether interrupts are enabled for this transition of the ACCESS_READY parameter, an interrupt 22 may be sent to the sender device at this time. If interrupts are not enabled, then the sender could alternatively determine that the receiver is now awake by polling the ACCESS_READY register 42 (periodically issuing a read transaction to read the ACCESS_READY register and check whether it has the first value).

On the other hand, if at step 106 the receiver MHU portion 32 has not yet indicated that it was awake, then at step 110 it is determined whether the sender device has attempted to access the sender control registers 38 in the sender MHU portion 30. If so then at step 112 an error indication is returned to the sender device to indicate that the receiver is not yet ready. If there is no attempt to access the sender registers at step 110, then at step 114 it is determined whether a timeout condition has arisen (e.g. a certain period of time has elapsed since sending the wakeup request at step 104), and if so then an error indication is transmitted at step 112. This provides a mechanism for recognising when, despite sending the wakeup request 66 to the power controller 6 in the receiver domain B, the receiver MHU portion 32 has not woken up, so that the sender can determine that the message send request has failed and can retry later. If there is no time out then the method returns to step 106 to carry on waiting for the receiver MHU portion 32 to wake up. If an error indication is returned at step 112, then this brings the protocol for handling the current message send request to an end, and the message returns to step 100 to await a subsequent message send request.

On the other hand, if the receiver does wake up, and the ACCESS_READY parameter 42 has been set to the first value at step 108, then the method proceeds to step 120 where the sender requests writing of a message to the message storage area in the second domain, by issuing write transactions specifying target addresses mapped to the receiver control registers 50. If at step 102 it was determined that the receiver portion was already awake when the original message send request was received, then steps 104 to 114 can be omitted and the method can proceed straight to step 120 (although in some examples the wakeup request could still be sent to the power controller to request that the receiver MHU portion 32 is maintained in the awake state, to reduce the likelihood of the receiver MHU portion 32 subsequently transitioning to the quiescent state). At step 122, the payload sent by the sender device in domain A is passed over payload signal line 62 to the receiver MHU portion 32, which either writes the payload to its receiver control registers 50, or triggers write transactions on the interconnect 12 to write the message payload to memory 14 (the receiver MHU portion 32 acting as message passing circuitry of the MHU 20).

The method then proceeds to step 124 of FIG. 5B, in which the receiver MHU portion 32 sends an interrupt 22 to the receiver device 8 within the receiver domain B. Some of the receiver registers 50 within the MHU 20-1 may control how that interrupt is sent. The receiver identifier provided by the sender device could identify which particular receiver should be interrupted, or alternatively interrupts may be sent to multiple devices which may each decide whether they are the receiver that should act on the message. In response to the interrupt, a given recipient device 8 may choose to read the message from the message storage area at step 126 (by issuing memory transactions specifying an address mapped to the message storage area). When the receiver reads the message, at step 128 the receiver device 8 issues a write transaction specifying an address mapped to the corresponding message status register of the receiver control registers 50, to update the message status to indicate that the message has been read, and the receiver MHU portion 32 clears the corresponding message interrupt 22. Hence, if the sender subsequently issues a read to an address corresponding to the relevant message status register 54, it can determine that the message has been read by the recipient. The method returns to step 126 to await reading of any further messages.

Meanwhile, the sender MHU portion 30 also checks at step 130 whether the sender device has deasserted its message send request. The sender can deassert the message send request by issuing another write to the access request register 40 setting the register to the opposite value to the value that represents an asserted message send request. The sender may defer deasserting its message send request until it has issued the write for the final message. When the sender deasserts the message send request, then the bridge wakeup signal 64 is also deasserted, and at step 132 the MHU 20-1 also deasserts the wakeup request 66 sent to the power controller 6 so that the power controller is no longer requested to maintain the receiver side in the awake state. Also, as the bridge wakeup signal 64 from the bridge slave 24 is no longer asserted, the bridge master 26 may now accept any request to transition to the quiescent state.

At step 134, the sender MHU portion 30 of the MHU 20-1 determines whether the receiver MHU portion 32 has transitioned to the quiescent state (as discussed above, this would happen only if the sender device has deasserted its message send request). If so, then at step 136 the ACCESS_READY parameter 42 is updated to a second value, to indicate that the receiver MHU portion 32 is in the quiescent state. Optionally, the sender device 8 in Domain A may be interrupted when the ACCESS_READY parameter 42 transitions from the first value to the second value, depending on whether interrupts are enabled by the interrupt enable (INT_ACCESS_EN) register 46. When the receiver transitions to the quiescent state, then at step 138 the sender MHU portion 30 determines whether there were any partially completed messages in the message storage area. This could be determined either by maintaining a flag within the sender control register 38 which tracks partial completion, or by requiring the receiver MHU portion 32 to signal to the sender MHU portion 30 if there are any partially completed messages for which the message status has not yet been cleared by the recipient device before accepting the request to transition to the quiescent state. If there are any partially completed messages then at step 140 the sender MHU portion 30 completes a message handling protocol for those partially completed messages. For example the error response block 36 may trigger an error indication which is sent back to the sender device in the sender domain to indicate the message has not been sent successfully. This error indication could be returned as soon as the transition of the receiver MHU portion 32 to the quiescent state is detected, or could be sent later when the sender device attempts to read the message status for the partially completed message. Having completed handling of any partially completed messages, then at step 142 it is determined whether any further message send request has been received and if so the method returns to step 100. The flow diagram cycles through steps 126-142 until all messages have been completed or a further message send request has been received.

Figure 6:
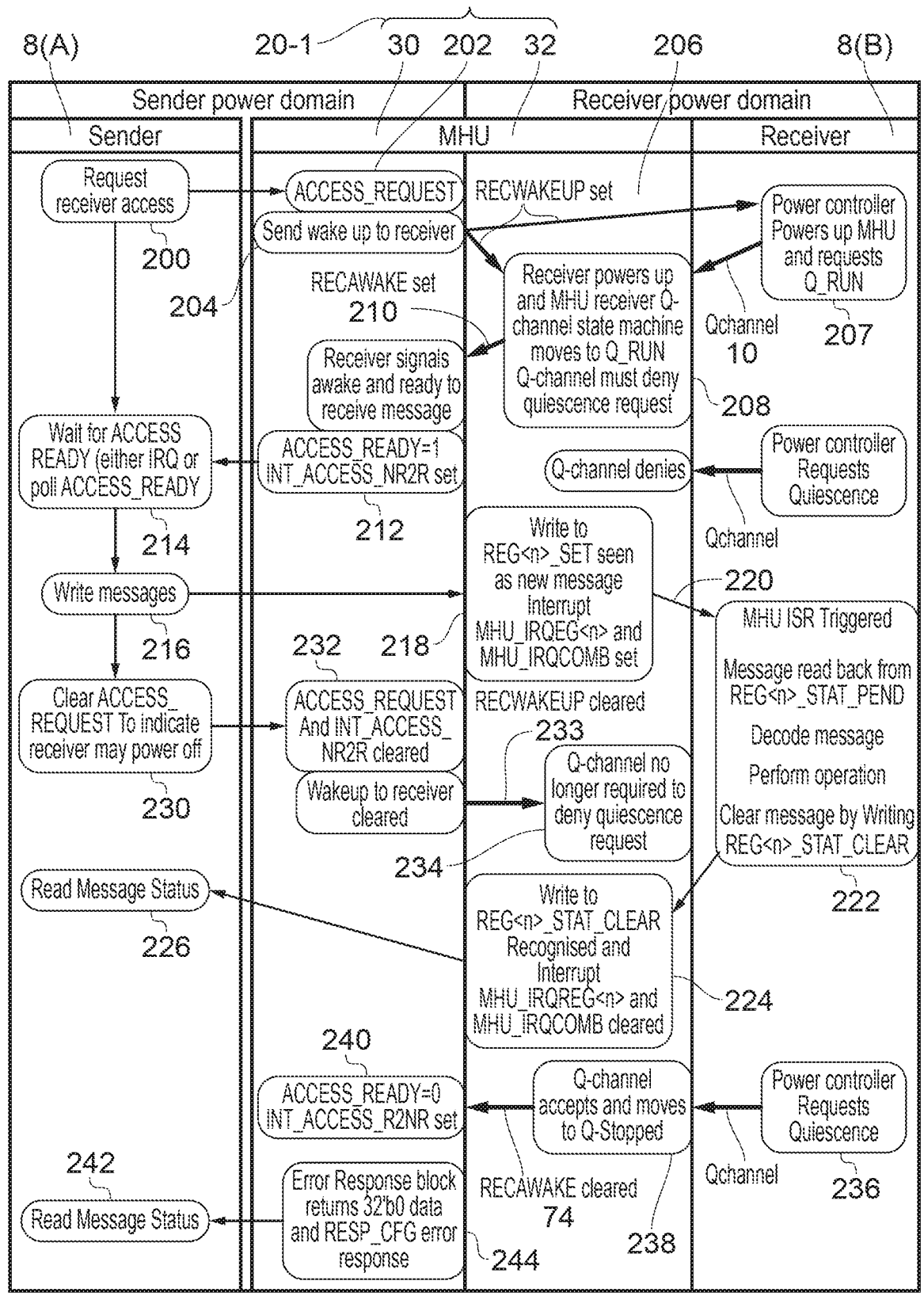
FIG. 6 shows an example of signals exchanged between the sender, the message handling unit, and the receiver.

FIG. 6 is a signal diagram showing an example of handling sending a message from a sender device 8(A) in a sender power domain (e.g. domain A) to a receiver device 8(B) in the recipient domain (e.g. domain B), via the sender and receiver MHU portions 30, 32 of the MHU 20-1. Of course, messages could also be passed from domain B to domain A in a similar way using MHU 20-2.

At step 200 the sender device 8(A) requests receiver access by sending the message send request, and at step 202 the MHU responds by setting the ACCESS_REQUEST register 42 to a first value (e.g. binary 1). At step 204 this triggers a wakeup signal 64 to the receiver MHU portion, which triggers a corresponding wakeup request 66 to the power controller 6 in the receiver domain B at step 206. The power controller 6 responds by requesting power up of the receiver MHU portion 32 using the power management channel 10 at step 207. At step 208, the receiver MHU portion 32 powers up and transitions to the awake state, and a subsequent request to return to the quiescent state would be denied while the wakeup signal 64 from the sender MHU portion 30 remains asserted. At step 210, the bridge master 26 in the receiver MHU portion 32 indicates to the sender MHU portion 30 that it is awake by sending the awake status signal 74. In response, at step 212 the sender MHU portion 30 sets the ACCESS_READY register 42 to a first value (e.g. binary 1) and also sets an interrupt status register INT_ACCESS_NR2R which may trigger an interrupt to the sender device 8(A) when the transition of ACCESS_READY from not ready (binary 0) to ready (binary 1) is detected. Alternatively, the interrupt may be suppressed and instead the sender device may poll the ACCESS_READY register.

Having waited at step 214 for ACCESS_READY to be set to the first value, once the interrupt or polling has established that the receiver side is ready, at step 216 the sender device 8(A) sends write transactions to write its messages to the message storage area in the receiver domain B. Either the sender device 8(A) can write its payload directly to the message status registers 54, or the receiver MHU portion 32 may generate write transactions for writing the received message payload to memory 14. To signal that the messages have been written, the sender device 8(A) triggers a write to the message set register 56 (REG<n>_SET) at step 218. In response to the write to the message set register 56, the receiver MPU portion 32 sends an interrupt to the receiver device 8(B) at step 220. In response to the interrupt, at step 222 the receiver device reads the message status from the message status registers 54, which could include the messages themselves or a pointer to the location memory 14 at which the receiver device 8(B) can read the messages. The receiver device 8(B) decodes the messages and acts upon those messages according to the particular information conveyed by the message. Once the message has been read, the receiver device clears the message by writing to the message clear register 58 (REG<n>_STAT_CLEAR). Writing to the message clear register 58 also triggers a clearing of the message status in the message status register 54. At step 224, the receiver MHU portion 32 recognises that the receiver has written to the message clear register 58 and so the interrupt registers which control the interrupt generated at step 220 are cleared to cancel the interrupt to the receiver device 8(B). A subsequent read of the message status by the sender device 8(A) at step 226 will then recognise that the message has successfully been read by the receiver 8(B).

Meanwhile, after writing the messages at step 216, at step 230 the sender device 8(A) clears its access request so that the receiver may power off if desired. Hence at step 232 the ACCESS_REQUEST register 40 is set to a second value (e.g. binary 0). Also, a register INT_ACCESS_NR2R for triggering generation of the interrupt at step 212 on the transition of the ACCESS_READY register 42 from not ready to ready may also be cleared to cancel any interrupt to the sender device 8(A). The clearing of the ACCESS_REQUEST register 40 also clears the wakeup signal 64 to the receiver MHU portion 32 (step 233) and the wakeup request 66 to the domain B power controller 6. Now the bridge master 26 is no longer required to deny a quiescent state entry request if received from the power controller (step 234). Hence, if at step 236 the power controller 6 issues the request signal 68 to request that the receiver MHU portion 32 enters the quiescent state, then at step 238 the bridge master 26 may accept the quiescence request and hence may clear its awake status signal 74, which at step 240 triggers the sender MHU portion 30 to switch the ACCESS_READY register 42 from the first value to a second value (e.g. binary 0). An interrupt status register INT_ACCESS_R2NR for tracking the ready to not ready transition may also be set, and if interrupts for this event are enabled, this may trigger an interrupt to the sender device 8(A) to inform the sender device that the receiver is no longer ready. Alternatively, even if not interrupted, if the sender device 8(A) attempts to read the message status at step 242 after the receiver MHU portion 32 has switched to the quiescent state, then the attempt to access the sender control registers 38 or receiver control registers 50 while ACCESS_READY 42 has the second value may trigger an error indication to be returned to the sender device 8(A) by the error response block 36 at step 244. Hence, even if receiver side is powered down and moves to the quiescent state before all the messages have been read by the receiver, the MHU 20-1 provides a mechanism for the sender to recognise that this has occurred, and to complete the protocol for the partially completed messages, so that these messages can be repeated later by the sender, and there is no need for the receiver on waking up to provide any continued processing of partially completed messages.

In summary, the message handling unit provides a technique for passing messages from a first domain to a second domain which do not share clock, reset or power supply. There is no need for a third shared safe area to store the messages in an always-on power domain. The method provides for the sender system to request access and grant of the receiver system, and the sender MHU portion 30 may trigger a wakeup request to the receiver MHU portion 32 if the receiver MHU portion 32 is not currently in the awake state. The bridge slave and master are hardened against receiver or sender reset, so that the other end of the bridge completes any outstanding transactions and the recoverable error is signalled to the sender. The MHU has a protocol which provides a mechanism for recognising if the receiver has transitioned back to the quiescent state part way through the handling of a set of messages sent from the sender.

Figure 7:
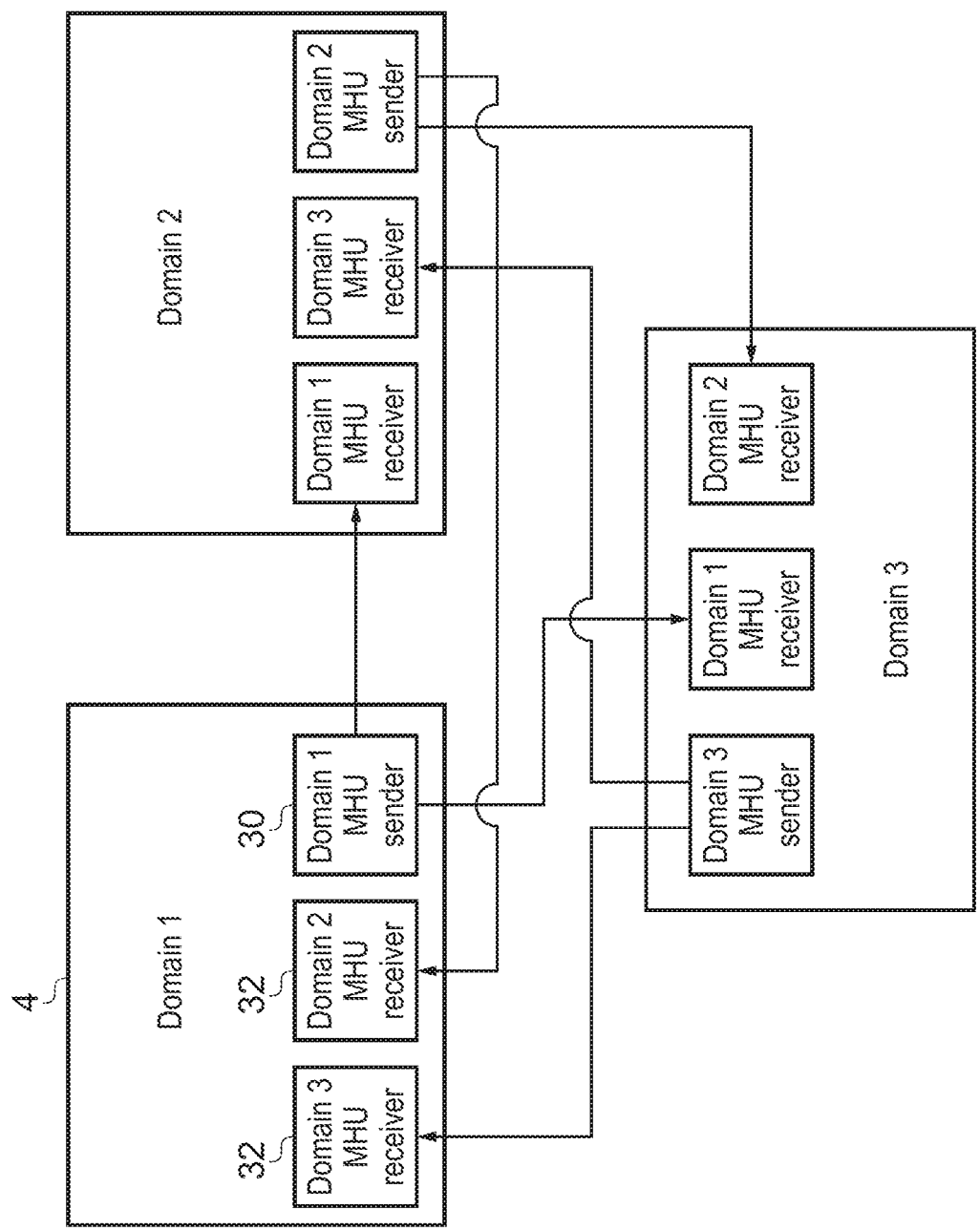
FIG. 7 illustrates an example of an integrated circuit with at least three power domains.

As shown in FIG. 7, some integrated circuits 2 may have three or more power domains. Although each pair of domains could have a unidirectional MHU 20 as in the example of FIGS. 1 to 4, this may require many distinct sender MHU portions to be implemented within each device or domain for handling the message passing.

Figure 8:
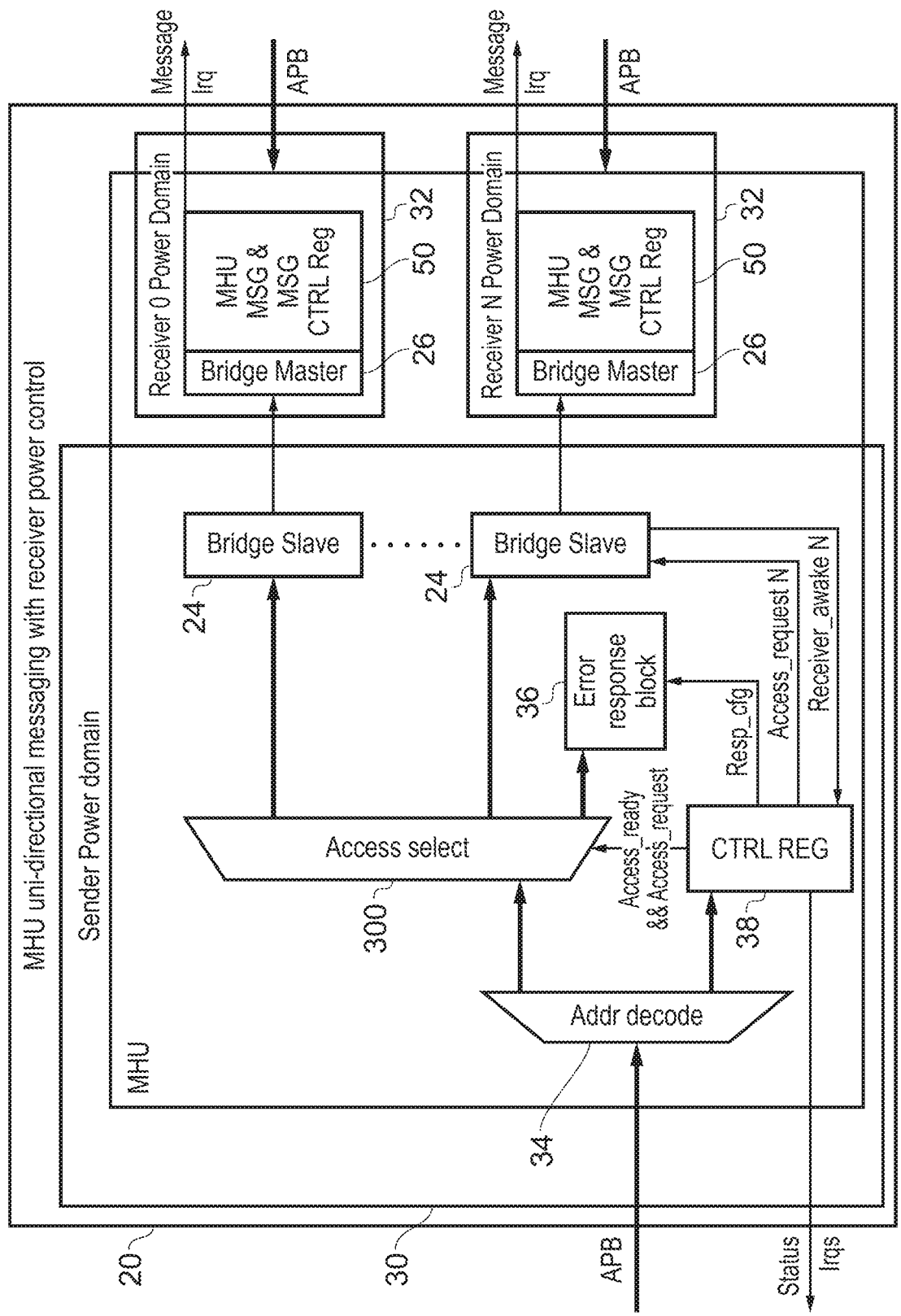
FIG. 8 shows an example of a message handling unit for handling messages sent from a sender in a first domain to receivers in two or more further domains.

Instead, as shown in FIGS. 7 and 8, systems with three or more domains can be implemented more efficiently by sharing the sender portion 30 of the MHU amongst multiple receiver portions corresponding to the different recipient domains, so that each domain 4 has a single sender MHU portion 30, and a number of receiver MHU portions 32, one for each other domain from which messages may be received. As shown in FIG. 8, the MHU architecture with this approach is similar to FIG. 4, except that the sender MHU portion 30 has multiple bridge slave interfaces 24, one for each of the receiver MHU portions 32 in the other domains, and an access selector 300 is provided to select which receiver's bridge slave interface 24 to route transactions to, based on which receiver is memory mapped to the address of the transactions. Each receiver MHU portion 32 may be identical to the receiver portion 32 in the example of FIGS. 1 to 4. The sender and receiver portions 30-32 operate in the same way as discussed above, except for the additional selection step performed by the selector 300. With this design, the MHU architecture can scale to multiple disassociated systems, where each system requires one message interface to exchange messages with multiple receiver systems. The message system described here allows the disassociated systems to have localised control over their own power, clock or reset without introducing inter-system dependencies just to pass request or information.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An integrated circuit comprising:
   a first power domain;
   a second power domain; and
   a message handling unit to control passing of messages sent from a sender circuit in the first power domain to a receiver circuit in the second power domain;
   the message handling unit comprising message passing circuitry configured to write messages sent from the sender circuit to a message storage area provided in the second power domain;
   wherein the message handling unit comprises wakeup requesting circuitry responsive to a message send request from the sender circuit requesting sending of at least one message to the receiver circuit when at least one circuit in the second power domain is in a quiescent state, to transmit a wakeup request to a second domain power controller circuitry to request that said at least one circuit in the second power domain transitions from the quiescent state to an awake state; and
   wherein the sender circuit is configured to defer writing of said at least one message to the message storage area in the second power domain until the message handling unit has indicated that said at least one circuit in the second power domain has transitioned from the quiescent state to the awake state in response to the wakeup request.

2. The integrated circuit according to claim 1, wherein said at least one circuit in the second power domain comprises a portion of the message handling unit implemented in the second power domain.

3. The integrated circuit according to claim 1, wherein the message handling unit comprises a sender storage area provided in the first power domain to store control data associated with sending of a message to the receiver circuit; and
   the message handling unit is configured to return an error indication to the sender circuit in response to the sender circuit accessing the sender storage area when said at least one circuit in the second power domain is in the quiescent state.

4. The integrated circuit according to claim 1, wherein the message handling unit is configured to return an error indication to the sender circuit when said at least one circuit in the second power domain fails to be transitioned from the quiescent state to the awake state in response to the wakeup request.

5. The integrated circuit according to claim 1, wherein the message handling unit is configured to set an access ready parameter to a first value in response to detecting that said at least one circuit of the second power domain has transitioned from the quiescent state to the awake state in response to the wakeup request.

6. The integrated circuit according to claim 5, wherein the message handling unit is configured to set the access ready parameter to a second value in response to detecting a transition of said at least one circuit of the second power domain from the awake state to the quiescent state.

7. The integrated circuit according to claim 6, wherein when the access ready parameter has the second value, the message handling unit is configured to return an error indication to the sender circuit in response to the sender circuit accessing a sender storage area provided in the first power domain to store control data associated with sending of a message to the receiver circuit.

8. The integrated circuit according to claim 1, wherein the message handling unit is configured to provide an interrupt signal to the sender circuit in response to detecting that said at least one circuit in the second power domain has transitioned from the quiescent state to the awake state in response to the wakeup request.

9. The integrated circuit according to claim 1, wherein the sender circuit is configured to poll an access ready parameter maintained by the message handling unit indicative of whether said at least one circuit in the second power domain is in the quiescent state, to determine whether said at least one circuit in the second power domain has transitioned from the quiescent state to the awake state in response to the wakeup request.

10. The integrated circuit according to claim 1, wherein following a transition of said at least one circuit in the second domain from the quiescent state to the awake state in response to the wakeup request, the second domain power controller circuitry is configured to deny a request to transition said at least one circuit in the second power domain from the awake state to the quiescent state while the wakeup request remains asserted.

11. The integrated circuit according to claim 10, wherein the message handling unit is configured to maintain assertion of the wakeup request until the sender circuit has deasserted the message send request.

12. The integrated circuit according to claim 11, wherein the sender circuit is configured to deassert the message send request following completion of writing of said at least one message to the message storage area.

13. The integrated circuit according to claim 1, wherein in response to detecting a reset of said at least one circuit of the second power domain or a transition of said at least one circuit of the second power domain from the awake state to the quiescent state, when at least one partially completed message remains pending in the message storage area, a portion of the message handling unit operating in the first power domain is configured to trigger completion of processing of said at least one partially completed message.

14. The integrated circuit according to claim 13, wherein said portion of the message handling unit is configured to return an error indication to the sender circuit in response to said at least one partially completed message.

15. The integrated circuit according to claim 1, wherein said message handling unit is incapable of handling messages sent from a sender circuit in the second power domain to a receiver circuit in the first power domain.

16. The integrated circuit according to claim 1, comprising a third power domain;
   wherein a common sender portion of the message handling unit in the first power domain is configured to communicate with a second domain receiver interface for requesting writing of messages to the message storage area in the second power domain, and with a third domain receiver interface for requesting writing of messages to a further message storage area in the third power domain to handle messages sent from the sender circuit in the first domain to a receiver circuit in the third power domain.

17. The integrated circuit according to claim 16, comprising a selector to select between the second domain receiver interface and the third domain receiver interface in dependence on receiver identifying information provided by the sender circuit in the first power domain.

18. A method for controlling passing of messages in an integrated circuit comprising a first power domain and a second power domain; the method comprising:
   receiving a message send request from a sender circuit in the first power domain requesting sending of at least one message to the receiver circuit, at a message handling unit for controlling passing of messages sent from the sender circuit in the first power domain to the receiver circuit in the second power domain, wherein the message handling unit comprises message passing circuitry configured to write messages sent from the sender circuit to a message storage area provided in the second power domain;

in response to receipt of the message send request when at least one circuit in the second power domain is in a quiescent state, wakeup requesting circuitry of the message handling unit transmitting a wakeup request to a second domain power controller circuitry to request that said at least one circuit in the second power domain transitions from the quiescent state to an awake state; and deferring writing of said at least one message to the message storage area in the second power domain until the message handling unit has indicated that said at least one circuit in the second power domain has transitioned from the quiescent state to the awake state in response to the wakeup request.

* * * * *